(12) United States Patent
Shao et al.

(10) Patent No.: US 11,532,938 B2
(45) Date of Patent: Dec. 20, 2022

(54) POWER SUPPLY CIRCUIT AND INVERTER (71) Applicant: Huawei Digital Power Technologies Co., Ltd., Shenzhen (CN)

(72) Inventors: Jincheng Shao, Shenzhen (CN); Jixin Zhu, Dongguan (CN); Xiaowei Xie, Shanghai (CN); Chen Wang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/471,794

(22) Filed: Sep. 10, 2021

(65) Prior Publication Data
US 2021/0408801 A1 Dec. 30, 2021

Related U.S. Application Data (63) Continuation of application No. PCT/CN2020/094961, filed on Jun. 8, 2020.

(30) Foreign Application Priority Data

Jun. 6, 2019 (CN) .......................... 201910493697.3

(51) Int. Cl.
*H02J 3/38* (2006.01)
*H02J 7/34* (2006.01)
*H02J 7/35* (2006.01)

(52) U.S. Cl.
CPC .............. *H02J 3/381* (2013.01); *H02J 7/345* (2013.01); *H02J 7/35* (2013.01); *H02J 2300/22* (2020.01)

(58) Field of Classification Search
CPC .... H02J 3/38; H02J 3/381; H02J 7/345; H02J 7/34; H02J 7/35; H02J 2300/22
See application file for complete search history.

(56) References Cited

FOREIGN PATENT DOCUMENTS

| CN | 200976509 Y | 11/2007 |
|---|---|---|
| CN | 202502401 U | 10/2012 |
| CN | 102856973 A | 1/2013 |
| CN | 204118757 U | 1/2015 |
| CN | 204886204 U | 12/2015 |
| CN | 106549501 A | 3/2017 |
| CN | 106788375 A | 5/2017 |
| CN | 107918569 A | 4/2018 |
| CN | 207442465 U | 6/2018 |
| CN | 110277823 A | 9/2019 |
| EP | 1591299 A1 | 11/2005 |
| JP | 2014166128 A | 9/2014 |

*Primary Examiner* — Robert L Deberadinis
(74) *Attorney, Agent, or Firm* — Womble Bond Dickinson (US) LLP (57) ABSTRACT

A power supply circuit includes a first input end (IN1), a second input end (IN2), a first output end (OUT1), and a second output end (OUT2). An input end of a first voltage conversion circuit (VCC) is used as IN1 and connected to an output end of a solar panel. A first output end of the first VCC is used as OUT1 and connected to a first power supply end of a monitoring chip. A second output end of the first VCC is connected to an input end of an energy storage module. An input end of the rectifier circuit is used as IN2 and connected to an AC power network. An output end of the rectifier circuit is connected to an input end of a second VCC. An output end of the second VCC and an output end of the energy storage module are used as OUT2 and connected to a second power supply end of the monitoring chip.

10 Claims, 5 Drawing Sheets

POWER SUPPLY CIRCUIT AND INVERTER

CROSS-REFERENCE TO RELATED APPLICATIONS

This application is a continuation of International Application No. PCT/CN2020/094961, filed on Jun. 8, 2020, which claims priority to Chinese Patent Application No. 201910493697.3, filed on Jun. 6, 2019. The disclosures of the aforementioned applications are hereby incorporated by reference in their entireties.

TECHNICAL FIELD

This application relates to the power supply field, and in particular, to a power supply circuit and an inverter.

BACKGROUND

In a solar power generation device, an inverter is configured to convert a direct current (DC) generated by a solar panel into an alternating current (AC), and connect to a power grid. In addition, a monitoring chip in the inverter is further configured to record power generation and running statuses of the solar panel.

Figure 1:
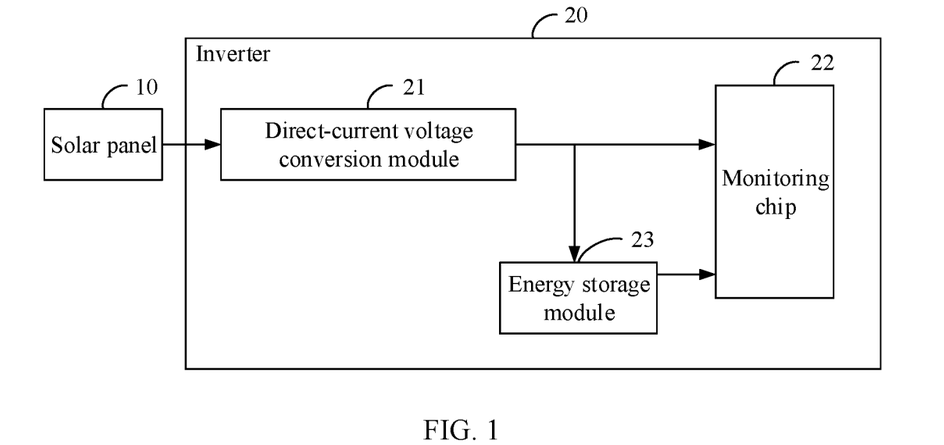
FIG. 1 is a schematic structural diagram 1 of an inverter according to an embodiment of this application.

As shown in FIG. 1, in a case of daylight, a direct-current voltage conversion module 21 of an inverter 20 converts a direct-current high voltage (for example, 1000 volts (V)) generated by a solar panel 10 into a working voltage (for example, 3.3 V) of a monitoring chip 22, so that the monitoring chip 22 can work normally. When there is no sunlight at night, the solar panel 10 cannot work, and therefore cannot supply power for normal working of the monitoring chip 22. In this case, an energy storage module (such as a battery or a super capacitor) 23 supplies power to a real-time clock in the monitoring chip 22, and the real-time clock can only be used for timing.

However, generally, working time of the solar panel needs to be relatively long (for example, 25 years). Due to frequent charging and discharging, a service life of the energy storage module is extremely short, and it is difficult to ensure long-term use.

SUMMARY

Embodiments of this application provide a power supply circuit and an inverter, to improve a service life of an energy storage module in a solar inverter.

To achieve the foregoing objective, the following technical solutions are used in the embodiments of this application.

According to a first aspect, a power supply circuit is provided and includes a first input end, a second input end, a first output end, a second output end, a first voltage conversion circuit, a rectifier circuit, a second voltage conversion circuit, and an energy storage module. An input end of the first voltage conversion circuit is used as the first input end of the power supply circuit, the first input end of the power supply circuit is configured to connect to an output end of a solar panel, a first output end of the first voltage conversion circuit is used as the first output end of the power supply circuit, the first output end of the power supply circuit is configured to connect to a first power supply end of a monitoring chip, a second output end of the first voltage conversion circuit is connected to an input end of the energy storage module, and the first power supply end is configured to supply power to the entire monitoring chip. An input end of the rectifier circuit is used as the second input end of the power supply circuit, the second input end of the power supply circuit is configured to connect to at least one phase of alternating current of an alternating current power network, an output end of the rectifier circuit is connected to an input end of the second voltage conversion circuit, and both an output end of the second voltage conversion circuit and an output end of the energy storage module are used as the second output end of the power supply circuit, the second output end of the power supply circuit is configured to connect to a second power supply end of the monitoring chip, and the second power supply end is configured to supply power to a real-time clock in the monitoring chip. The first voltage conversion circuit is configured to convert a direct-current high voltage output by the solar panel into a working voltage of the monitoring chip, the rectifier circuit is configured to convert an alternating-current voltage of the at least one phase of alternating current of the alternating current power network into a direct-current voltage, the second voltage conversion circuit is configured to convert the direct-current voltage output by the rectifier circuit into a working voltage of the real-time clock in the monitoring chip, and when the alternating current power network keeps power on, a voltage output by the output end of the second voltage conversion circuit is higher than a voltage output by the output end of the energy storage module.

According to an embodiment, when sunlight is sufficient to make the solar panel work normally, the first voltage conversion circuit converts the direct-current high voltage output by the solar panel into the working voltage of the monitoring chip, to supply power to the entire monitoring chip, and charge the energy storage module. During normal working at night, when the alternating current power network keeps power on, the voltage output by the output end of the second voltage conversion circuit is higher than the voltage output by the output end of the energy storage module, and when the alternating current power network is used to supply power to the real-time clock in the monitoring chip, the energy storage module can be prevented from continuing to supply power to the real-time clock in the monitoring chip, thereby reducing a charging and discharging frequency of the energy storage module, and improving a service life of an energy storage module in a solar inverter.

The output end of the second voltage conversion circuit and the output end of the energy storage module are connected. Therefore, during normal working at night, when the alternating current power network keeps power on, a voltage output by the second voltage conversion circuit is higher than a voltage output by the energy storage module, so that the energy storage module cannot output a current. Therefore, full power can be maintained, and frequent charging or discharging is not required. When the voltage output by the second voltage conversion circuit and the voltage output by the energy storage module are equal or the voltage output by the second voltage conversion circuit is lower than the voltage output by the energy storage module, the energy storage module can also discharge at night. Therefore, generally, the energy storage module is not used for power supply. The energy storage module supplies power only when the voltage output by the second voltage conversion circuit is 0 in an extreme case in which sunlight is insufficient and the alternating current power network is powered off. The energy storage module is equivalent to an uninterruptible power supply. When the sunlight is insufficient and the alternating current power network is powered off, it is ensured that power is supplied to the real-time clock in the monitoring chip.

In an embodiment, the second voltage conversion circuit is a resistor voltage division circuit. The resistor voltage division circuit is simple in structure and relatively low in costs.

In an embodiment, the second voltage conversion circuit includes a first resistor and a second resistor, a first end of the first resistor is connected to a positive electrode output end of the rectifier circuit, a second end of the first resistor is connected to a first end of the second resistor and the second power supply end of the monitoring chip, and a second end of the second resistor is connected to a negative electrode output end of the rectifier circuit. The first resistor and the second resistor perform, through voltage division, voltage conversion on a direct-current voltage output by the rectifier circuit, so that a voltage output to a second input end of the monitoring chip is the working voltage of the real-time clock in the monitoring chip.

In an embodiment, a fifth diode is further connected in series to the output end of the second voltage conversion circuit, a positive electrode of the fifth diode is connected to the second end of the first resistor, and a negative electrode of the fifth diode is connected to the second power supply end of the monitoring chip. The fifth diode may also be referred to as a reverse diode, and is configured to provide a stable reference voltage for the output end of the second voltage conversion circuit.

In an embodiment, the second voltage conversion circuit further includes a first capacitor and a second capacitor, the first capacitor is connected in parallel to the second resistor, a first end of the second capacitor is connected to the negative electrode of the fifth diode, and a second end of the second capacitor is connected to a grounding end of the second voltage conversion circuit. The first capacitor and the second capacitor are used for energy storage.

In an embodiment, the rectifier circuit can be a half-bridge rectifier circuit or a full-bridge rectifier circuit.

In an embodiment, the rectifier circuit includes a positive electrode output end, a negative electrode output end, a first diode, and a second diode. A positive electrode of the first diode is connected to a first end of the at least one phase of alternating current of the alternating current power network, and a negative electrode of the first diode is the positive electrode output end. A negative electrode of the second diode is connected to a second end of the at least one phase of alternating current of the alternating current power network, and a positive electrode of the second diode is the negative electrode output end.

In an embodiment, the rectifier circuit further includes a third diode and a fourth diode. A positive electrode of the third diode is connected to the negative electrode of the second diode, and a negative electrode of the third diode is connected to the negative electrode of the first diode. A positive electrode of the fourth diode is connected to the positive electrode of the second diode, and a negative electrode of the fourth diode is connected to the positive electrode of the first diode.

In an embodiment, a third resistor is connected in series to the positive electrode output end of the rectifier circuit, and a fourth resistor is connected in series to the negative electrode output end of the rectifier circuit. The third resistor and the fourth resistor play a role of current limiting.

According to a second aspect, an inverter is provided and includes the power supply circuit and the monitoring chip according to the first aspect or any implementation of the first aspect, where a first input end of the power supply circuit is connected to an output end of a solar panel, a second input end of the power supply circuit is connected to at least one phase of alternating current of an alternating current power network, a first output end of the power supply circuit is connected to a first power supply end of the monitoring chip, the first power supply end is configured to supply power to the entire monitoring chip, a second output end of the power supply circuit is connected to a second power supply end of the monitoring chip, and the second power supply end is configured to supply power to a real-time clock in the monitoring chip.

For technical effects of the second aspect, refer to content in the first aspect.

DESCRIPTION OF EMBODIMENTS

In a scenario of generating power by using a solar panel, the solar panel outputs a direct current, and the direct current needs to be converted into an alternating current by using an inverter, to access an alternating current power network.

Figure 2:
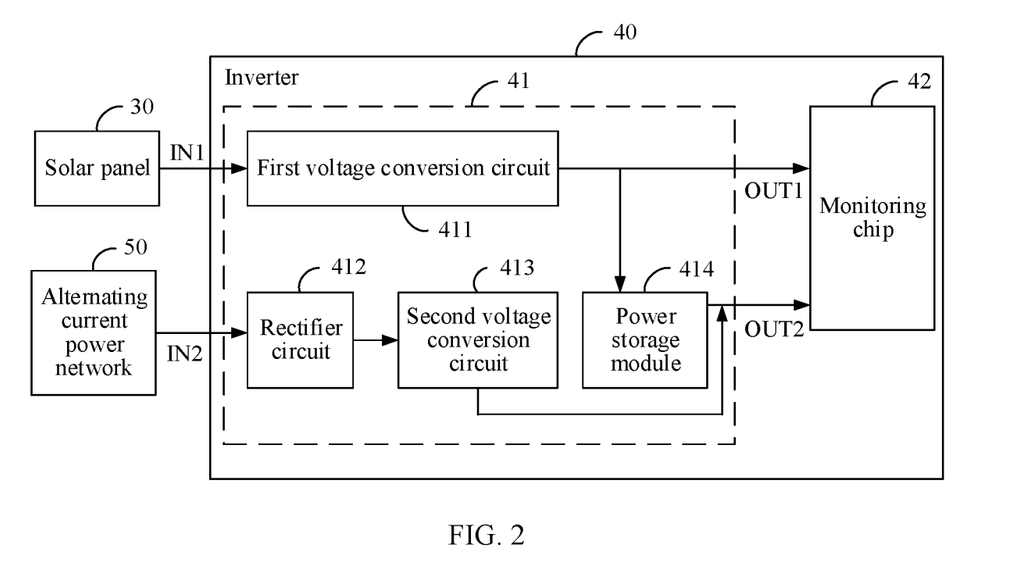
FIG. 2 is a schematic structural diagram 2 of an inverter according to an embodiment of this application.

This application provides an inverter, and the inverter may be a solar inverter. As shown in FIG. 2, the inverter 40 includes a power supply circuit 41 and a monitoring chip 42.

A first input end of the power supply circuit 41 is connected to an output end of a solar panel 30. A second input end of the power supply circuit 41 is connected to at least one phase of alternating current of an alternating current power network 50. A first output end of the power supply circuit 41 is connected to a first power supply end of the monitoring chip 42, and the first power supply end is configured to supply power to the entire monitoring chip 42. A second output end of the power supply circuit 41 is connected to a second power supply end of the monitoring chip 42, and the second power supply end is configured to supply power to a real-time clock (real time clock, RTC) in the monitoring chip 42.

The monitoring chip 42 is configured to record power generation and running statuses of the solar panel 30. When the solar panel 30 work normally in daytime or in a case of sufficient sunlight, the power supply circuit 41 is configured to convert a direct-current high voltage output by the solar panel 30 into a working voltage of the monitoring chip 42, to supply power to the entire monitoring chip 42. When the solar panel 30 does not work normally at night or in a case of insufficient sunlight, the power supply circuit 41 is configured to convert an alternating-current high voltage of an alternating current power network 50 into a working voltage of the real-time clock in the monitoring chip 42, to supply power to the real-time clock in the monitoring chip 42.

In an embodiment, as shown in FIG. 2, the power supply circuit 41 includes a first input end IN1, a second input end IN2, a first output end OUT1, a second output end OUT1, a first voltage conversion circuit 411, a rectifier circuit 412, a second voltage conversion circuit 413, and an energy storage module 414.

An input end IN1 of the first voltage conversion circuit 411 is used as the first input end IN1 of the power supply circuit 41, and the first input end IN1 of the power supply circuit 41 is configured to connect to the output end of the solar panel 30. A first output end of the first voltage conversion circuit 411 is used as the first output end OUT1 of the power supply circuit 41, and a first output end OUT1 of the power supply circuit 41 is configured to connect to the first power supply end of the monitoring chip 42. A second output end of the first voltage conversion circuit 411 is connected to an input end of the energy storage module 414. The first power supply end is configured to supply power to the entire monitoring chip 42.

An input end IN2 of the rectifier circuit 412 is used as the second input end IN2 of the power supply circuit 41, and the second input end IN2 of the power supply circuit 41 is configured to connect to at least one phase of alternating current of the alternating current power network 50. An output end of the rectifier circuit 412 is connected to an input end of the second voltage conversion circuit 413. Both an output end of the second voltage conversion circuit 413 and an output end of the energy storage module 414 are used as the second output end OUT2 of the power supply circuit 41, and the second output end OUT2 of the power supply circuit 41 is configured to connect to the second power supply end of the monitoring chip 42. The second power supply end is configured to supply power to the real-time clock in the entire monitoring chip 42.

The first voltage conversion circuit 411 is configured to convert the direct-current high voltage output by the solar panel 30 into the working voltage of the monitoring chip 42. The rectifier circuit 412 is configured to convert an alternating-current voltage of the at least one phase of alternating current of the alternating current power network into a direct-current voltage. The second voltage conversion circuit 413 is configured to convert the direct-current voltage output by the rectifier circuit 412 into the working voltage of the real-time clock in the monitoring chip 42. In addition, when the alternating current power network keeps power on, a voltage output by the output end of the second voltage conversion circuit 413 is higher than a voltage output by the output end of the energy storage module 414.

A specific working principle of the circuit is as follows. When the solar panel 30 works normally in daytime or in a case of sufficient sunlight, the first voltage conversion circuit 41 converts the direct-current high voltage output by the solar panel 30 into the working voltage of the monitoring chip 42, to supply power to the entire monitoring chip 42, and charge the energy storage module 414. When the solar panel 30 does not work normally at night or in a case of insufficient sunlight, the rectifier circuit 412 and the second voltage conversion circuit 413 convert an alternating-current voltage of the at least one phase of alternating current of the alternating current power network 50 into the working voltage of the real-time clock in the monitoring chip 42, to supply power to the real-time clock in the monitoring chip 42.

The voltage output by the output end of the second voltage conversion circuit 413 is higher than the voltage output by the output end of the energy storage module 414, and when the alternating current power network 50 is used to supply power to the real-time clock in the monitoring chip, the energy storage module 414 can be prevented from continuing to supply power to the real-time clock in the monitoring chip, thereby reducing a charging and discharging frequency of the energy storage module 414, and improving a service life of the energy storage module in the solar inverter.

The output end of the second voltage conversion circuit 413 and the output end of the energy storage module 414 are connected. Therefore, during normal working at night, when the alternating current power network keeps power on, a voltage output by the second voltage conversion circuit 413 is higher than a voltage output by the energy storage module 414, so that the energy storage module 414 cannot output a current. Therefore, full power can be maintained, and frequent charging or discharging is not required. When the voltage output by the second voltage conversion circuit 413 and the voltage output by the energy storage module 414 are equal or the voltage output by the second voltage conversion circuit 413 is lower than the voltage output by the energy storage module 414, the energy storage module 414 can also discharge at night. Therefore, generally, the energy storage module is not used for power supply, and the energy storage module 414 supplies power only when the voltage output by the second voltage conversion circuit 413 is 0 in an extreme case in which sunlight is insufficient and the alternating current power network is powered off. The energy storage module 414 is equivalent to an uninterruptible power supply. When the sunlight is insufficient and the alternating current power network is powered off, it is ensured that power is supplied to the real-time clock in the monitoring chip.

Figure 3:
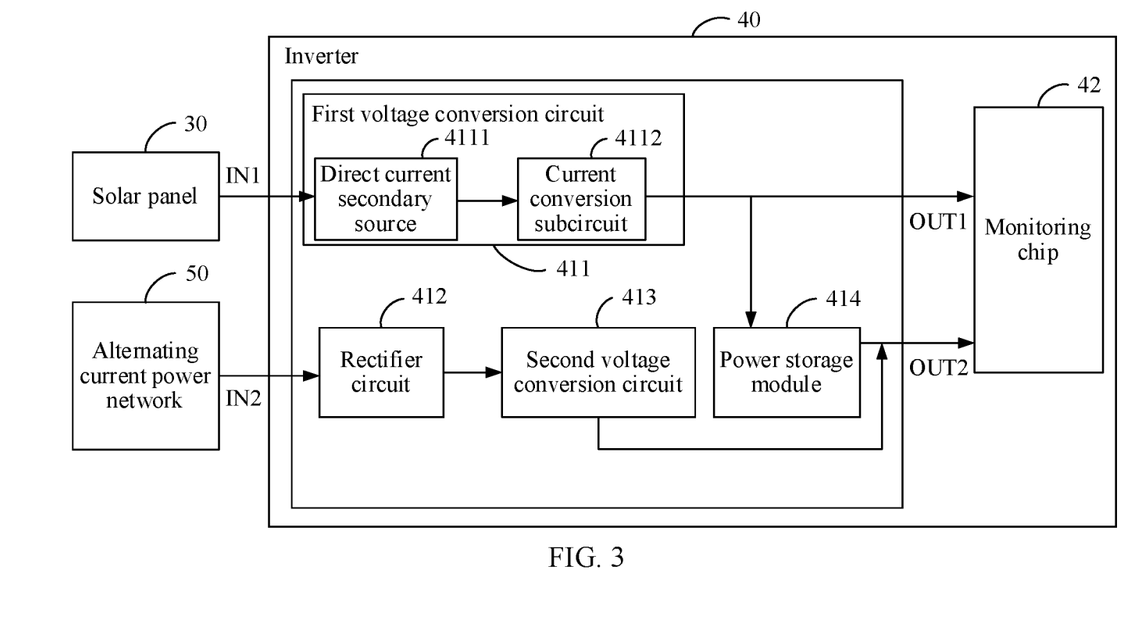
FIG. 3 is a schematic structural diagram 3 of an inverter according to an embodiment of this application.

For example, as shown in FIG. 3, the first voltage conversion circuit 411 may include a direct current secondary source 4111 and a voltage conversion subcircuit 4112. An input end of the direct current secondary source 4111 is used as the first input end of the power supply circuit 41, and is connected to the output end of the solar panel 30. An output end of the direct current secondary source 4111 is connected to an input end of the voltage conversion subcircuit 4112, and an output end of the voltage conversion subcircuit 4112 is used as the first output end of the power supply circuit 41, and is connected to the input end of the energy storage module 414 and the first power supply end of the monitoring chip 42 of the inverter.

The direct current secondary source 4111 is configured to convert the direct-current high voltage (for example, 1000 V) output by the solar panel 30 into a direct-current low voltage (for example, 13 V), and the voltage conversion subcircuit 4112 is configured to convert a direct-current low voltage output by the direct current secondary source 4111 into the working voltage of the monitoring chip 42.

In an embodiment, the rectifier circuit 412 may be a half-bridge rectifier circuit or a full-bridge rectifier circuit. The second voltage conversion circuit 413 may be a resistor voltage division circuit. Implementation of the resistor voltage division circuit is relatively simple, and costs of the voltage conversion circuit can be reduced.

Figure 4:
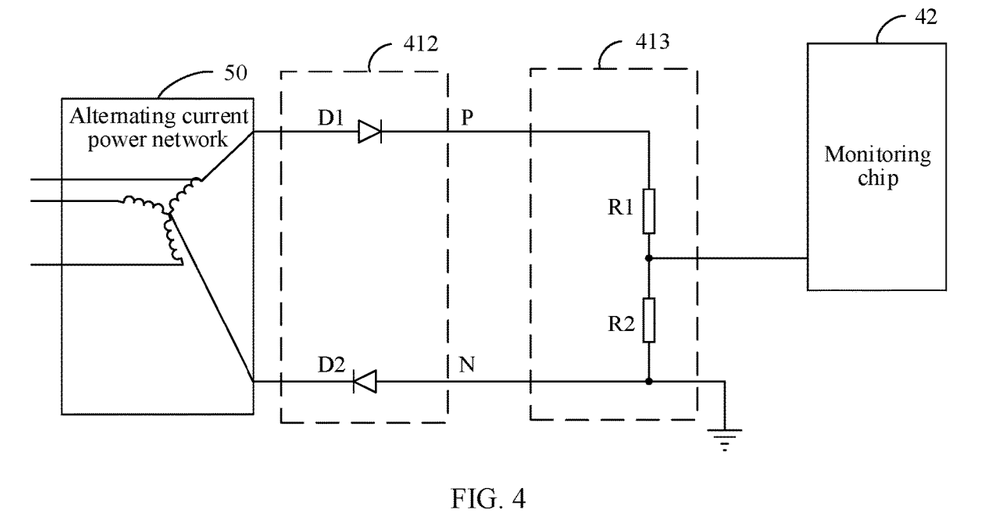
FIG. 4 is a schematic structural diagram 1 of a rectifier circuit and a second voltage conversion circuit according to an embodiment of this application.

For example, FIG. 4 shows a specific implementation of a rectifier circuit and a second voltage conversion circuit that are provided in this application. In this implementation, the rectifier circuit 412 is a half-bridge rectifier circuit, and the input end of the rectifier circuit 412 is connected to a single phase of the alternating current power network 50.

The rectifier circuit 412 includes a positive electrode output end P, a negative electrode output end N, a first diode D1, and a second diode D2. A positive electrode of the first diode D1 is connected to a first end of the at least one phase of alternating current of the alternating current power network 50, and a negative electrode of the second diode D2 is connected to a second end of the at least one phase of alternating current of the alternating current power network 50. A negative electrode of the first diode D1 is used as the positive electrode output end P of the rectifier circuit 412, and a positive electrode of the second diode D2 is used as the negative electrode output end N of the rectifier circuit 412.

The second voltage conversion circuit 413 includes a first resistor R1 and a second resistor R2. As the positive electrode output end P that is of the rectifier circuit 412 and that is connected to a first end of the first resistor R1, a second end of the first resistor R1 is connected to a first end of the second resistor R2 and the second power supply end of the monitoring chip 42, and a second end of the second resistor R2 is connected to the negative electrode output end N of the rectifier circuit 412.

The first resistor R1 and the second resistor R2 perform, through voltage division, voltage conversion on a direct-current voltage output by the rectifier circuit 412, so that a voltage output to a second input end of the monitoring chip 42 is the working voltage of the real-time clock in the monitoring chip 42.

Figure 5:
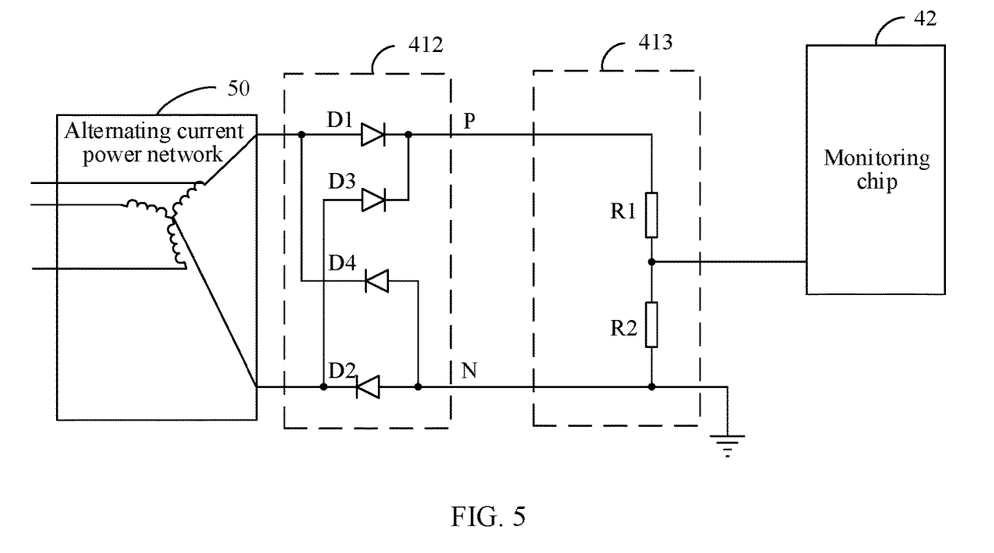
FIG. 5 is a schematic structural diagram 2 of a rectifier circuit and a second voltage conversion circuit according to an embodiment of this application.
Figure 7:
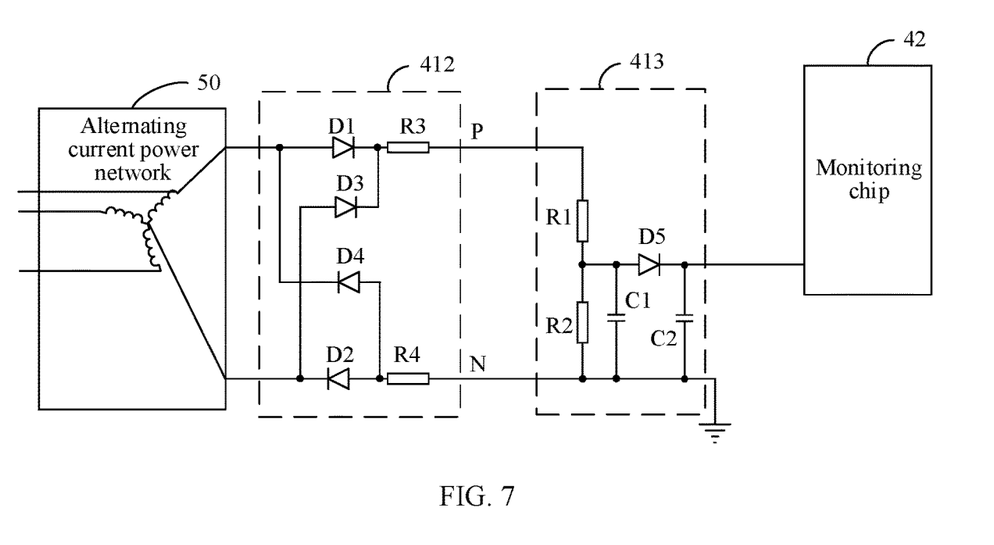
FIG. 7 is a schematic structural diagram 4 of a rectifier circuit and a second voltage conversion circuit according to an embodiment of this application.

In an embodiment, as shown in FIG. 5 and FIG. 7, based on FIG. 4, the rectifier circuit 412 may further include a third diode D3 and a fourth diode D4. A positive electrode of the third diode D3 is connected to the negative electrode of the second diode D2, and a negative electrode of the third diode D3 is connected to the negative electrode of the first diode D1. A positive electrode of the fourth diode D4 is connected to the positive electrode of the second diode D2, and a negative electrode of the fourth diode D4 is connected to the positive electrode of the first diode D1. In this case, the rectifier circuit 412 is a full-bridge rectifier circuit.

Figure 6:
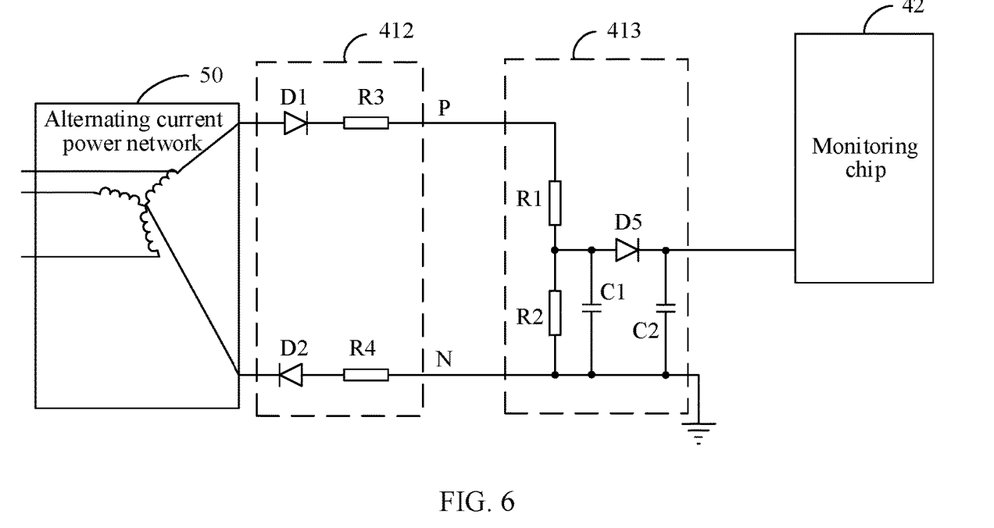
FIG. 6 is a schematic structural diagram 3 of a rectifier circuit and a second voltage conversion circuit according to an embodiment of this application.

In an embodiment, as shown in FIG. 6 and FIG. 7, based on FIG. 4, a third resistor R3 is connected in series to the positive electrode output end of the rectifier circuit 412, and a fourth resistor R4 is connected in series to the negative electrode output end of the rectifier circuit 412. The third resistor R3 and the fourth resistor R4 play a role of current limiting.

In an embodiment, as shown in FIG. 6 and FIG. 7, based on FIG. 4, a fifth diode D5 is further connected in series to the output end of the second voltage conversion circuit 413. A positive electrode of the fifth diode D5 is connected to the second end of the first resistor R1, and a negative electrode of the fifth diode D5 is connected to the second power supply end of the monitoring chip 42. The fifth diode D5 may also be referred to as a reverse diode, and is configured to provide a stable reference voltage for the output end of the second voltage conversion circuit 413.

In an embodiment, as shown in FIG. 6 and FIG. 7, based on FIG. 4, the second voltage conversion circuit 413 may further include a first capacitor C1 and a second capacitor C2, the first capacitor C1 is connected in parallel to the second resistor R2, a first end of the second capacitor C2 is connected to the negative electrode of the fifth diode D5, and a second end of the second capacitor C2 is connected to a grounding end of the second voltage conversion circuit 413. The first capacitor C1 and the second capacitor C2 are used for energy storage.

Figure 8:
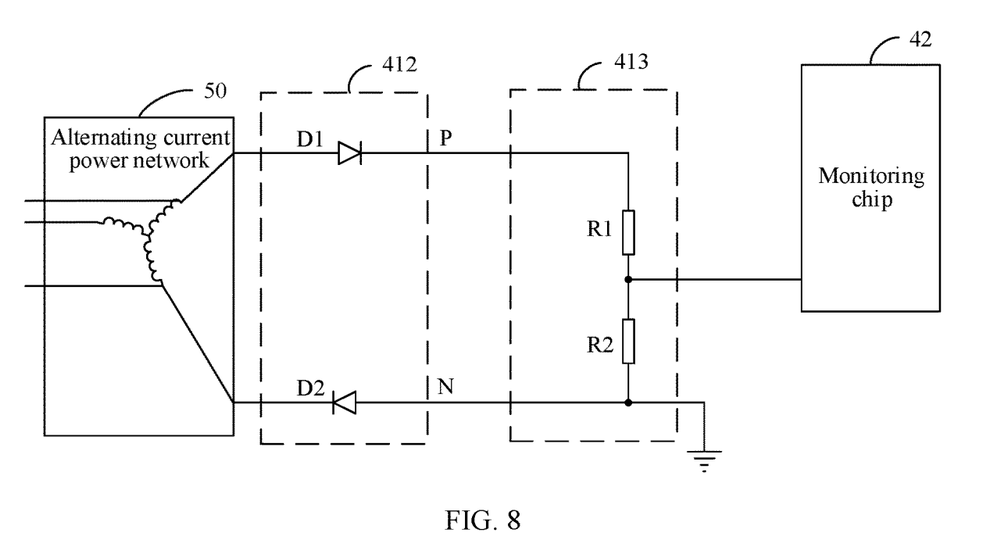
FIG. 8 is a schematic structural diagram 5 of a rectifier circuit and a second voltage conversion circuit according to an embodiment of this application.

For example, FIG. 8 shows another specific implementation of a rectifier circuit and a second voltage conversion circuit that are provided in this application. In an embodiment, the rectifier circuit 412 is a half-bridge rectifier circuit, and the input end of the rectifier circuit 412 is connected to two phases of the alternating current power network 50.

FIG. 8 differs from FIG. 4 in that the first end of the at least one phase of alternating current of the alternating current power network 50 and the second end of the at least one phase of alternating current of the alternating current power network 50 in FIG. 4 are described for a same end of the alternating current power network 50. The first end of the at least one phase of alternating current of the alternating current power network 50 in FIG. 8 is a non-common end of a first phase of the alternating current power network 50, and the second end of the at least one phase of alternating current of the alternating current power network 50 is a non-common end of a second phase of the alternating current power network 50. For other content, refer to the foregoing descriptions. Details are not repeated herein.

Similarly, the two phases shown in FIG. 8 may also be replaced with a single-phase connection manner shown in FIG. 4 to FIG. 7. For other content, refer to the foregoing descriptions. Details are not repeated herein.

The half-bridge rectifier circuit and the full-bridge rectifier circuit can output voltages and currents of a same waveform. However, in a rectification process, the half-bridge rectifier circuit and the full-bridge rectifier circuit bear different reverse voltages or currents. A peak value of a voltage output by the half-bridge rectifier circuit is only half an input voltage. Therefore, when output power is the same, the half-bridge rectifier circuit needs to bear twice the reverse voltage or current of the full-bridge rectifier circuit. Therefore, there is a relatively high requirement for a specification of a diode in the half-bridge rectifier circuit. The full-bridge rectifier may be applied to high-power rectification.

In addition, the half-bridge rectifier circuit needs to use a central tap transformer to implement full-wave rectification. Otherwise, only half-wave rectification can be implemented. The full-wave rectification means to rectify both an upper half-wave and a lower half-wave of an alternating current sinusoidal wave. The half-wave rectification means to rectify the upper half-wave or the lower half-wave of the alternating current sinusoidal wave.

According to an embodiment, when sunlight is sufficient to make the solar panel work normally, the first voltage conversion circuit converts the direct-current high voltage output by the solar panel into the working voltage of the monitoring chip, to supply power to the entire monitoring chip, and charge the energy storage module. During normal working at night, when the alternating current power network keeps power on, the voltage output by the output end of the second voltage conversion circuit is higher than the voltage output by the output end of the energy storage module, and when the alternating current power network is used to supply power to the real-time clock in the monitoring chip, the energy storage module can be prevented from continuing to supply power to the real-time clock in the monitoring chip, thereby reducing a charging and discharging frequency of the energy storage module, and improving a service life of an energy storage module in a solar inverter.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power supply circuit, comprising:
    a first input end to be connected to an output end of a solar panel;
    a second input end to be connected to at least one phase of alternating current (AC) of an AC power network;
    a first output end to be connected to a first power supply end of a monitoring chip to provide power to the monitoring chip;
    a second output end to be connected to a second power supply end of the monitoring chip to supply power to a real-time clock in the monitoring chip;
    an energy storage module having an input end and an output end, the output end being connected to the second output end of the power supply circuit;
    a first voltage conversion circuit, including:
        an input end coupled to the first input end of the power supply circuit,
        a first output end connected to the first output end of the power supply circuit, and
        a second output end connected to the input end of the energy storage module;
    a second voltage conversion circuit having an input end and an output end, the output end being connected to the second output end of the power supply circuit; and
    a rectifier circuit, including:
        an input end connected to the second input end of the power supply circuit, and
        an output end connected to the input end of the second voltage conversion circuit,
    wherein the first voltage conversion circuit is configured to convert a direct-current (DC) high voltage output by the solar panel into a working voltage of the monitoring chip, the rectifier circuit is configured to convert an alternating-current (AC) voltage of the at least one phase of AC of the AC power network into a DC voltage, the second voltage conversion circuit is configured to convert the DC voltage output by the rectifier circuit into a working voltage of the real-time clock in the monitoring chip, and a voltage output by the output end of the second voltage conversion circuit is higher than a voltage output by the output end of the energy storage module.

2. The power supply circuit according to claim 1, wherein the second voltage conversion circuit is a resistor voltage division circuit.

3. The power supply circuit according to claim 2, wherein the second voltage conversion circuit comprises a first resistor and a second resistor, wherein a first end of the first resistor is connected to a positive electrode output end of the rectifier circuit, a second end of the first resistor is connected to a first end of the second resistor and the second power supply end of the monitoring chip, and a second end of the second resistor is connected to a negative electrode output end of the rectifier circuit.

4. The power supply circuit according to claim 3, wherein the second voltage conversion circuit further comprises a diode connected in series to the output end of the second voltage conversion circuit, wherein a positive electrode of the diode is connected to the second end of the first resistor, and a negative electrode of the diode is connected to the second power supply end of the monitoring chip.

5. The power supply circuit according to claim 4, wherein the second voltage conversion circuit further comprises:
    a first capacitor connected in parallel to the second resistor; and
    a second capacitor, wherein a first end of the second capacitor is connected to the negative electrode of the diode, and a second end of the second capacitor is connected to a grounding end of the second voltage conversion circuit.

6. An inverter, comprising:
    a monitoring chip having a first power supply end and a second power supply end; and
    a power supply circuit, including
        a first input end to be connected to an output end of a solar panel;
        a second input end to be connected to at least one phase of alternating current (AC) of an AC power network;
        a first output end to be connected to the first power supply end of the monitoring chip to provide power to the monitoring chip;
        a second output end to be connected to the second power supply end of the monitoring chip to supply power to a real-time clock in the monitoring chip;
        an energy storage module having an input end and an output end, the output end being connected to the second output end of the power supply circuit;
        a first voltage conversion circuit, including:
            an input end coupled to the first input end of the power supply circuit,
            a first output end connected to the first output end of the power supply circuit, and
            a second output end connected to the input end of the energy storage module;
        a second voltage conversion circuit having an input end and an output end, the output end being connected to the second output end of the power supply circuit; and
        a rectifier circuit, including:
            an input end connected to the second input end of the power supply circuit, and
            an output end connected to the input end of the second voltage conversion circuit,
        wherein the first voltage conversion circuit is configured to convert a direct-current (DC) high voltage output by the solar panel into a working voltage of the monitoring chip, the rectifier circuit is configured to convert an alternating-current (AC) voltage of the at least one phase of AC of the AC power network into a DC voltage, the second voltage conversion circuit is configured to convert the DC voltage output by the rectifier circuit into a working voltage of the real-time clock in the monitoring chip, and a voltage output by the output end of the second voltage conversion circuit is higher than a voltage output by the output end of the energy storage module.

7. The inverter according to claim 6, wherein the second voltage conversion circuit is a resistor voltage division circuit.

8. The inverter according to claim 7, wherein the second voltage conversion circuit comprises a first resistor and a second resistor, wherein a first end of the first resistor is connected to a positive electrode output end of the rectifier circuit, a second end of the first resistor is connected to a first end of the second resistor and the second power supply end of the monitoring chip, and a second end of the second resistor is connected to a negative electrode output end of the rectifier circuit.

9. The inverter according to claim 8, wherein the second voltage conversion circuit further comprises a diode connected in series to the output end of the second voltage conversion circuit, wherein a positive electrode of the diode is connected to the second end of the first resistor, and a negative electrode of the diode is connected to the second power supply end of the monitoring chip.

10. The inverter according to claim 9, wherein the second voltage conversion circuit further comprises:
- a first capacitor connected in parallel to the second resistor; and
- a second capacitor, wherein a first end of the second capacitor is connected to the negative electrode of the diode, and a second end of the second capacitor is connected to a grounding end of the second voltage conversion circuit.

* * * * *